United States Patent [19]

Dietz et al.

[11] Patent Number: 4,664,435
[45] Date of Patent: May 12, 1987

[54] SUN VISOR FOR VEHICLES

[75] Inventors: Günter Dietz, Wuppertal; Manfred Nowak, Solingen; Klaus-Peter Kaiser, Wermelskirchen, all of Fed. Rep. of Germany

[73] Assignee: Gebr. Happich GmbH, Fed. Rep. of Germany

[21] Appl. No.: 664,054

[22] Filed: Oct. 23, 1984

[30] Foreign Application Priority Data

Nov. 26, 1983 [DE] Fed. Rep. of Germany ....... 3342897

[51] Int. Cl.⁴ .................................................. B60J 3/02
[52] U.S. Cl. ................................. 296/97 H; 296/97 R
[58] Field of Search .................. 296/97 R, 97 B, 97 H, 296/97 K; 160/DIG. 3

[56] References Cited

U.S. PATENT DOCUMENTS

| 3,193,323 | 7/1965 | Herr et al. | 296/97 H |
| 4,174,864 | 11/1979 | Viertel et al. | 296/97 H |
| 4,272,118 | 6/1981 | Viertel et al. | 296/97 H X |
| 4,363,511 | 12/1982 | Viertel et al. | 296/97 H X |

FOREIGN PATENT DOCUMENTS

| 1259725 | 1/1968 | Fed. Rep. of Germany | 296/97 K |
| 2396666 | 3/1979 | France | 296/97 R |
| 1043087 | 9/1966 | United Kingdom | 296/97 H |
| 1452220 | 10/1976 | United Kingdom | 296/97 H |

Primary Examiner—Robert B. Reeves
Assistant Examiner—Russell D. Stormer
Attorney, Agent, or Firm—Ostrolenk, Faber, Gerb & Soffen

[57] ABSTRACT

A sun visor for vehicles is disclosed which has a cushioning sun visor body surrounded by a cover layer and stiffened by an incorporated reinforcement insert. At one end of one of the longitudinal edges of the body, a support shaft is mounted with one end in the body and the other end held by a swivel bearing. At the other end of the same longitudinal edge, a support pin is mounted extending across a recess defined in that edge. The support pin is approximately parallel to that longitudinal edge and can be detachably engaged with the support receiver of an outer support. The support pin is formed, in whole or in part, of a plastic body which is injection molded directly onto a region of the cover layer.

20 Claims, 7 Drawing Figures

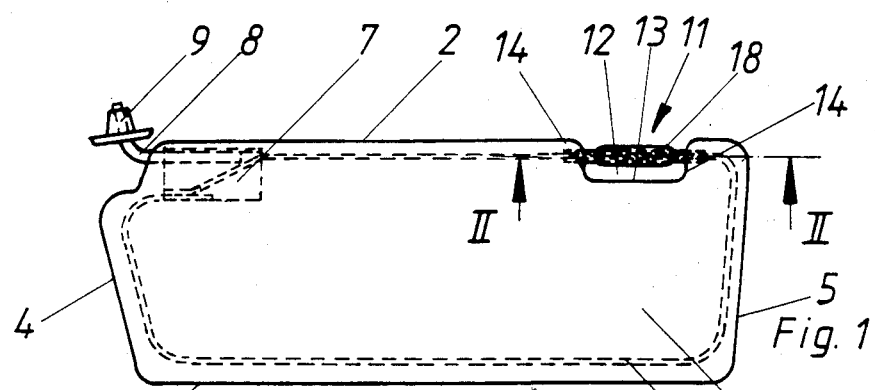
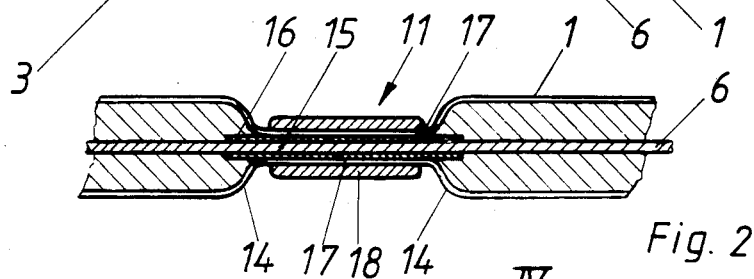
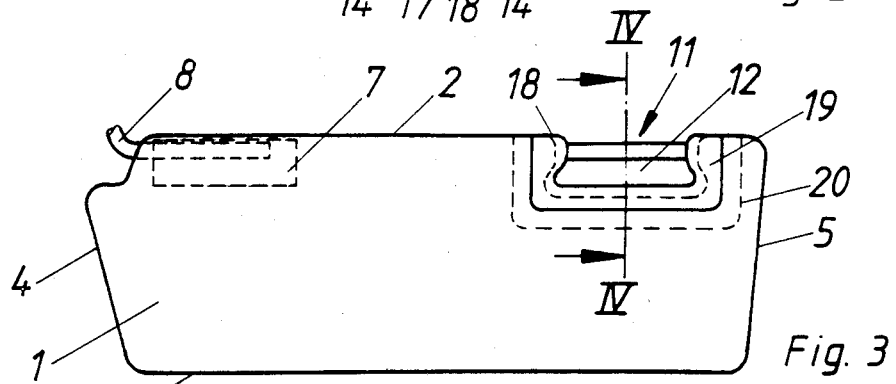
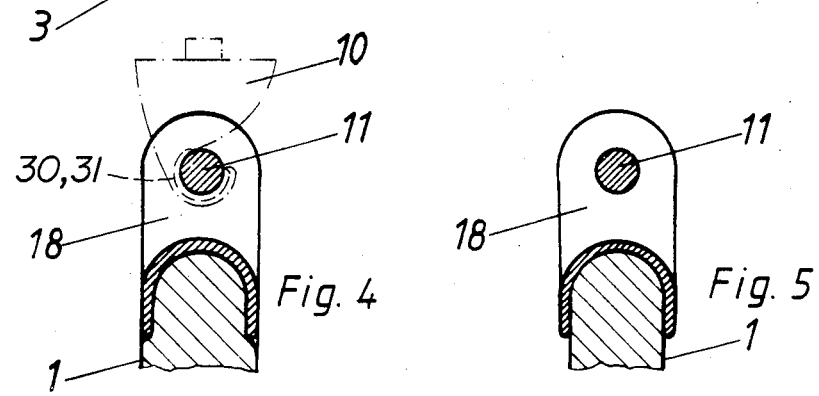

SUN VISOR FOR VEHICLES

BACKGROUND OF THE INVENTION

1. Field of the Invention

The present invention relates to a sun visor for a vehicle.

2. Description of the Prior Art

A sun visor is known which has a sun visor body which serves as a cushioning body. The body is embedded on a foil cover, and is stiffened by a reinforcement insert incorporated in the body. The sun visor body has a support pin or shaft disposed at one end of one of its longitudinal edges. One end of the support pin is incorporated in the body while its other end is received in a swivel bearing. The body also has a support pin at the other end region of the same longitudinal edge which extends across a recess in said longitudinal edge to which it is approximately parallel, said pin being adapted to be detachably engaged in the support receiver of an outer support.

German Utility Model No. GM 81 25 330 discusses the manufacturing problem involved in attaching the support pin into the sun visor cushioning body in such a manner that the pin does not prevent the covering of the body by the foil cover. As discussed there, the cushioning body is to be covered by covering both of its sides with separate foils. The two foils are then to be welded together in a single operation along and following the contour of the edge of the sun visor body.

German Utility Model No. GM 81 25 330 also indicates that this manufacturing problem is solved in two different ways in the prior art. German Patent DE OS No. 1 259,725 discloses a solution in which the support pin is incuded within the foil covering so that the support pin is covered by the foil. When the sun visor is in its engaged position, however, the foil covering fits between the outer support and the support pin. As a result, the swinging of the sun visor may possibly distort the covering and the covering may be damaged; for example, the covering may be torn by the bursting of a weld seam.

German Utility Model No. GM 19 41 202 discloses a second solution in which the support pin is fastened in a supporting cushioning body only after the foil covering is completely on the body. The support pin is then inserted through edge openings in the foil into the cushioning body. The support pin is inserted into a holding member which is incorporated into the body, the shape of which does not interfere with the foil covering. The holding member attaches the pin to the body.

German Utility Model No. GM 81 25 330, which also relates to this second solution of the manufacturing problem, discloses a sun visor in which the support pin is straight from end to end. Its ends extend through openings in the covering into insertion holes in the respective arms of an approximately U-shaped holding yoke fastened into the sun visor cushioning body within the covering. The support pin is secured by one insertion hole against turning and by the other insertion hole against axial displacement with respect to the holding yoke. In this known sun visor, the support pin must first be inserted into the insertion hole which permits axial displacement. Only then may the support pin be axially secured by pushing the support pin back into the other insertion hole, possibly utilizing a snap effect. This method of manufacture requires the manufacture, storage and assembly of additional parts. It also requires a considerable amount of manual dexterity. It also consumes an extrememly large amount of time and labor, especially because the cushioning body must be deformed in order to insert the support pin into the first insertion hole which permits axial displacement.

SUMMARY OF THE INVENTION

One object of the present invention is therefore to simplify the manufacture of a sun visor of the type described above. In particular, an object of the invention is to improve the assembly and arrangement of the sun visor's support pin. These and other objects are achieved according to the invention by a support pin, all or part of which is a plastic member injection molded directly onto a region of the cover layer of plastic foil or other material.

The support pin of the invention may thus be provided or completed by injection molding plastic onto a sun visor body which is already complete except for the support pin. The manufacture or completion of the support pin requires only a small plastic injection mold into which the sun visor body is placed. The injected plastic covers only a relatively small region of the body. The body can be covered by injection molding rapidly and simply in no more time than is necessary for the manufacture of a separately produced plastic support pin or shaft. Covering the sun visor body by injection molding has the clear advantage that the support pin may be formed directly on the sun visor body without after-working and thus need not be mounted in the laborious manner described above. Accordingly, the invention simplifies and reduces the cost of manufacturing a sun visor while substantially improving its quality.

In one embodiment of the invention, the inner part of the support pin is formed integrally with the sun visor body and is also enclosed within a cover layer of plastic foil or other material. The support pin bears a tubular plastic body or cover which is injection molded directly onto the cover layer of foil or material. This embodiment is particularly significant since the sun visor body can be conventionally manufactured with the existing tools. Only the additional step of the injection molding around the support pin or cover layer in the region of the support pin is required. This additional step, which has an insignificant cost, results in the production or completion of a support pin whose covering can no longer burst at the seam and which is of precisely cylindrical shape and therefore can turn easily in the outer support while having good resistance to abrasion.

The injection molded plastic body according to the invention may have a shorter length than the support pin so that its two ends do not extend to the side walls which define the recess across which the support pin extends. This arrangement facilitates the manufacture of the plastic body or cover since the region at each end of the support pin not covered by the plastic body can be used as an abutment for the halves of the injection mold, which close tightly around the pin.

The support pin preferably includes an inner core, a cover layer which concentrically surrounds the core, and a plastic body or cover which concentrically surrounds the cover layer. The core is preferably a portion of the reinforcement insert and the plastic body or cover is a plastic injection molding which is injection molded onto the cover layer foil and forms an intimate bond with it.

In a further embodiment of the sun visor of the invention, the support pin has at least one electrical contact mounted in a hole which passes perpendicularly through the plastic body, the cover layer and the core. The electrical contact makes contact with a mating contact arranged in the outer support and with the core which consists of electrically conductive material. The core is connected through a contact to a source of electric light mounted in the sun visor body. In this embodiment, the core of the support pin may also have an axial separation or space defined in it. Each end piece of the core may thus be connected to an electrical contact which may, in turn, be connected through corresponding contacts in the outer support to the electrical system of the vehicle. The reinforcement insert, which forms the core, may have a second separation or space defined in it to form two electrical conductors for a source of electric light mounted in the sun visor body. The interruption or space in the reinforcement insert or in the core in the central region of the support pin results in a weak point in the reinforcing insert, but this weak point is covered and supported in the manner of a sleeve joint by the plastic body or cover, which is injection molded onto the support pin.

In another embodiment of the invention, a plastic injection molding shaped like a frame is injection molded onto the walls defining the recess in the longidutinal edge of the sun visor body. One side of the frame may be shaped to form a cylindrical support pin. In this embodiment, the other frame sides preferably enclose or grip the walls defining the recess. The frame sides are also directed parallel to the walls and have a U-shaped or semicircular cross-section. In this embodiment of the invention, the support is injection molded onto the sun visor body after it has been completely fabricated except for the pin. Therefore, this embodiment is of particular advantage for a sun visor whose body is surrounded by a cover layer of flat textile material, such as woven or knitted fabric or the like. Such a material tends to unravel at the edges which are welded or otherwise connected to each other, particularly if the separation seams are sharply curved, as is true near the recess in the sun visor body. The injection molding around all of the walls which define the recess provides the support pin and at the same time prevents the covering material from unraveling.

The invention was not obvious because it was contrary to the expectations in the art. It had been feared that the layer of covering material which surrounds the sun visor body might be damaged by injection molding a plastic body onto it, due to the relatively high injection temperatures. Surprisingly, a covering material consisting of plastic foil is not damaged, but, rather, is only slightly fused on its surface in the region of the injection molding. One unexpected advantage is that an intimate bond is established between the covering material and the plastic injection molding. Even in the case of a textile covering material, however, no singeing of the material occurs, as might be expected, but again an intimate bond is formed since the plastic material penetrates into the mesh of the textile material during injection and is anchored therein.

Other objects, features and advantages of the invention will be apparent from the following description, together with the accompanying drawings and the appended claims.

BRIEF DESCRIPTION OF THE DRAWINGS

Various embodiments of the invention will be explained in further detail below, with reference to the drawings, in which:

FIG. 1 shows a side view of a first embodiment of the sun visor.

FIG. 2 shows an enlarged section along the line II—II in FIG. 1.

FIG. 3 shows a side view of a second embodiment of the sun visor.

FIG. 4 shown an enlarged section along the line IV—IV in FIG. 3.

FIG. 5 shows a section from the same view as FIG. 4 of an alternative embodiment.

DETAILED DESCRIPTION OF THE PREFERRED EMBODIMENTS

1. General Description

Figure 6:
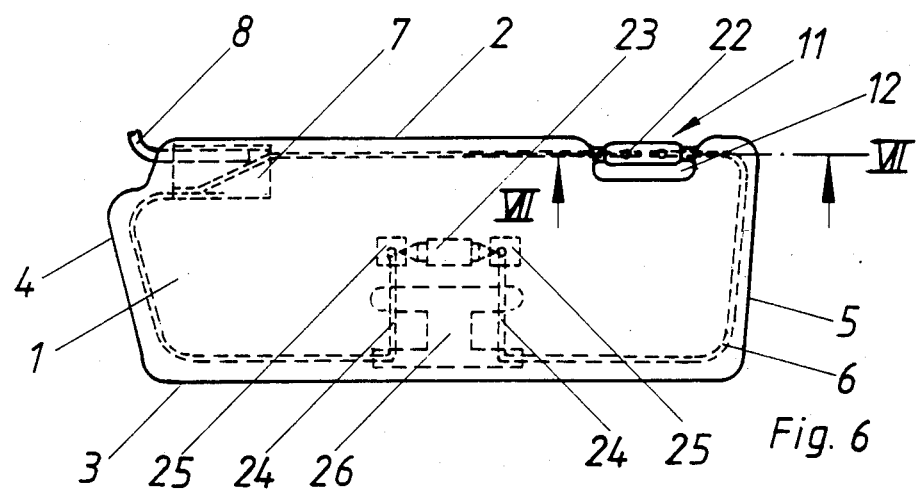
FIG. 6 shows a side view of a third embodiment.

The sun visor shown in the drawings has a sun visor body 1 shaped to form a cushioning body having a nearly rectangular profile and a flat shape. The sun visor body 1 has an upper longitudinal edge 2, a lower longitudinal edge 3, and side edges 4 and 5. Near and approximately parallel to edges 2–5, a reinforcement insert 6, which may be a wire frame is incorporated in sun visor body 1.

At one end of upper longitudinal edge 2, the sun visor body 1 has an incorporated support housing 7 attached to reinforcement insert 6, as shown on the left in FIGS. 1, 3 and 6. One arm of an approximately L-shaped support shaft 8 is mounted in support housing 7. The other arm of support shaft 8 is seated in a swivel bearing 9 or other swiveling support adapted to be fastened to a car body. As shown on the right in FIGS. 1, 3 and 6, an outer support is also arranged near the opposite end of the upper longitudinal edge 2. This outer support includes an outer support housing 10 adapted to be fastened to the car body and shown in dash-dot line in FIG. 4. The outer support also includes a support pin 11 adapted to be detachably engaged in the mounting recess of support housing 10. Support pin 11 is aligned along a common axis of rotation with the arm of the support shaft 8 positioned within the support housing 7.

The support pin 11 extends across a recess 12 defined in the upper longitudinal edge 2 of sun visor body 1. Recess 12 is offset from the upper longitudinal edge 2, and has a bottom wall 13 and two side walls 14.

2. Embodiments of the Invention

In the embodiment shown in FIGS. 1 and 2, the support pin 11 includes an inner core 15 which is an integral part of the reinforcement insert 6, a sleeve 16 of weldable plastic material which concentrically surrounds the core 15, a cover layer 17 which concentrically surrounds the sleeve 16 and may be formed of two plastic foil blanks welded together at their edges, and an injection molded plastic body 18 which concentrically surrounds the cover layer 17 and is shaped like a tube. The inner core 15 could alternately be an integral part of the cushioning sun visor body 1.

The plastic body 18 is produced in an operation subsequent to the welding of cover layer 17 by injection molding around the cover layer in the region of support pin 11. As shown in the drawings, the plastic body 18 does not extend all the way to the side walls 14 of the recess 12, but has its ends spaced a short distance from them, leaving a length of the foil-covered sleeve 16 at each end of support pin 11 where the halves of the injection mold may abut to prevent emergence of the plastic composition.

The embodiment shown in FIGS. 3 to 5 has the same basic construction as that of FIGS. 1 and 2. In this case, however, the sun visor body 1 is produced without providing the support pin 11. In this embodiment, support pin 11 is formed subsequently, after the cushioning body has been covered with the cover layer 17 which may be plastic foil blanks welded all around at the edge. Support pin 11 is then formed by direct injection molding around the cover layer 17 in the region of the outer support. The support pin 11 is preferably one side of an injection molded plastic body 18 which is shaped like and an approximately rectangular frame 19. The other sides of the frame surround the bottom wall 13 and side walls 14 of the recess 12, as is shown in FIGS. 4 and 5.

In FIG. 4, the walls 13, 14 which define the recess 12 are shaped with constricted regions or regions of narrowed thickness which are filled by the plastic body 18. As a result, the plastic body 18 does not extend beyond the two main side surfaces of sun visor body 1. This is not the case in the embodiment shown in FIG. 5, in which the plastic injection molding 18 which forms the frame 19 with the cylindrical support pin 11 protrudes slightly beyond the main side surfaces of sun visor body 1.

The frame sides of the injection molded plastic body 18, with the exception of the side forming the support pin 11, have a U-shaped or semicircular cross-sectional profile which grips the walls 13, 14. In order to form the frame 19 with clean side edges, an abutment 20, shown in dot-dash line, is preferably arranged within the sun visor body 1 adjacent the recess 12. The abutment 20 is adapted to absorb the closing pressure of the injection mold halves.

Figure 7:
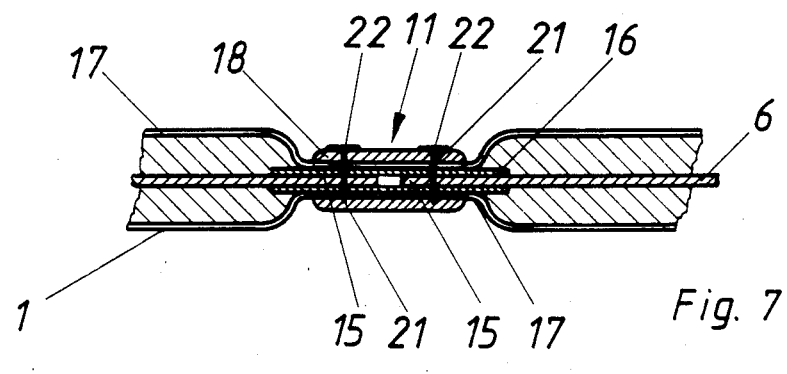
FIG. 7 shows an enlarged section along the line VII—VII in FIG. 6.

The embodiment shown in FIGS. 6 and 7 also has substantially the same construction as that shown in FIGS. 1 and 2, but with some improvements. Specifically, core 15 is interrupted approximately at the center of support pin 11 and the end regions of support pin 11 are spaced apart or electrically isolated. The end regions may be held apart by an interposed, electricallly non-conductive spacer (not shown) or by forming a sleeve 16 by inejecting plastic material around the reinforcement insert 6 in the region of the outer support.

Support pin 11 is provided with two holes perpendicular to its axis which pass through the cover or plastic body 18, the cover layer 17, the sleeve 16 and, in each case, a respective one of the end pieces of the core 15. Each hole receives the plug 21 of a respective electrical contact 22. The contacts 22 make contact, preferably only when the sun visor is positioned for use, with mating contacts (30, 31) arranged in the outer support housing 10. The mating contacts are, in turn, connected to the electrical system of the vehicle. This arrangement powers an electrical source of light 23 within the sun visor body 1 and shielded by a glass (not shown).

In the embodiment shown in FIGS. 6 and 7, the reinforcement insert 6 also functions as an electrical conductor, in addition to stiffening the sun visor body 1. As shown in FIG. 6, the reinforcement insert 6 has two bent sections 24 near lower longitudinal edge 3 which are directed upward and toward the upper longitudinal edge 2. A lamp socket 25 or other appropriate light source contact is clamped or soldered to the free end of each bent section 24. Between the lamps sockets 25 is supported the source lf light 23, which in this embodiment is shaped like a tubular bulb. The reinforcement insert 6 in this case includes two parts which are separate from each other, one of which electrically connects the first contact 22 with the first lamp socket 25 while the other connects the second contact 22 with the second lamp socket 25. In order to assure the stability of the reinforcement insert 6, the two parts are held together, on the upper side, by the support pin 11, which has a plastic body 18 injection molded around it, and, on the lower side, by a plastic bridge 26 near the lower longitudinal edge 3.

It is also possible to arrange only one electrical contact 22 in the support pin 11, the contact 22 being electrically connected to one lamp socket 25 through the reinforcement insert 6. In this case, an electric wire, which passes, for instance, through the support shaft 8, is connected to the lamp socket 25 to complete the circuit.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A sun visor for a vehicle, comprising:
   a sun visor body comprising a cushioning body and a reinforcement insert in the cushioning body for stiffening the sun visor body; the sun visor body having a longitudinal edge extending between first and second opposite ends, the sun visor body further having a recess defined in the longitudinal edge near the second end thereof;
   a cover layer surrounding the sun visor body;
   a support shaft having a first end mounted in the sun visor body at the first end of the longitudinal edge and a second end opposite the first end for mounting in a swivel bearing; and
   a support pin extending across the recess approximately parallel to the longitudinal edge and adapted for detachably engaging a support receiver of an outer support for supporting the sun visor on the outer support, the support pin comprising a plastic body injection molded directly onto the cover layer around the perimeter of the recess and covering at least part of the support pin for protecting the cover layer at the support pin.

2. The sun visor of claim 1 in which the support pin further comprises an inner part formed integrally with one of the cushioning body and the reinforcement insert and further comprises a part of the cover layer surrounding the inner part; the plastic body being a tubular plastic cover injection molded diretly onto the part of the cover layer surrounding the inner part.

3. The sun visor of claim 2 in which the sun visor body has first and second spaced apart side walls for defining the recess, the inner part of the support pin extending a length between the first and second side walls, the plastic cover being shorter than the length between the first and second side walls and having first and second ends, each disposed toward and spaced apart from a respective one of the first and second side walls.

4. The sun visor of claim 2 in which the inner part of the support pin comprises an inner core formed integrally with the reinforcement insert, the part of the cover layer concentrically surrounding the inner core and the injection molded plastic cover concentrically surrounding the part of the cover layer; the plastic cover having an intimate bond with the cover layer.

5. The sun visor of claim 4 in which the support pin has an axis and has at least one hole defined therein perpendicular to the axis; the hole passing through the inner core, the part of the cover layer surrounding the inner core and the plastic cover; the reinforcement insert and the inner core comprising electrically conductive material; the support pin further comprising an electrical contact in the hole and contacting the inner core for making contact with a mating contact in the outer support for supporting the support pin; the sun visor further comprising a light source contact for supporting an electrical light source on the sun visor body, the light source contact being connected to the reinforcement insert.

6. The sun visor of claim 5 in which the support pin has a second hole spaced apart from the first-mentioned hole defined therein; the support pin further comprising a second electrical contact in the second hole and contacting the inner core for making contact with a second mating contact in the outer support and spaced from the first-mentioned mating contact; the inner core of the support pin comprising first and second electrically conductive end regions for contacting the first and second electrical contacts, respectively; the first and second end regions being axially separated from each other; the reinforcement insert comprising first and second electrically conductive parts connected respectively to the first and second end regions; the first-mentioned light source contact being connected to the first electrically conductive part; the sun visor further comprising a second light source contact for supporting the electrical light source and connected to the second electrically conductive parts.

7. The sun visor of claim 1 in which the sun visor body has a wall for defining the recess, the sun visor further comprising a plastic frame injection molded directly onto the cover layer surrounding the wall, the support pin forming a part of the plastic frame.

8. The sun visor of claim 7 in which the plastic frame comprises a side having a U-shaped cross-section for enclosing the wall.

9. The sun visor of claim 7 in which the plastic frame comprises a side having a U-shaped cross-section for enclosing the wall.

10. A sun visor for a vehicle, comprising:
a sun visor body having a longitudinal edge, the sun visor body further having a recess defined in the longitudinal edge; the sun visor body having a wall for defining the recess;
a cover layer surrounding the sun visor body; and
a support pin extending across the recess approximately parallel to the longitudinal edge and adapted for detachably engaging an outer support for supporting the sun visor on the outer support, the sun visor body further comprising a plastic frame injection molded directly onto the cover layer and surrounding the perimeter of the wall defining the recess; the support pin comprising a part of the plastic frame injection molded directly onto the cover layer at the support pin.

11. The sun visor of claim 10 in which the support pin further comprises an inner part formed integrally with the sun visor body and a part of the cover layer surrounding the inner part; the plastic body being a tubular plastic cover injection molded directly onto the part of the cover layer surrounding the inner part.

12. The sun visor of claim 11 in which the sun visor body has first and second spaced apart side walls for defining the recess, the inner part of the support pin extending a length between the first and second side walls, the plastic cover being shorter than the length between the first and second side walls and having first and second ends, each disposed toward and spaced apart from a respective one of the first and second side walls.

13. The sun visor of claim 11 in which the inner part of the support pin comprises an inner core formed integrally with the sun visor body, the part of the cover concentrically surrounding the inner core and the injection molded plastic cover concentrically surrounding the part of the cover layer; the plastic cover having an intimate bond with the cover layer.

14. The sun visor of claim 11 in which the sun visor body comprises a reinforcement insert for stiffening the sun visor body, the inner part of the support pin being formed integrally with the reinforcement insert; the support pin having an axis and at least one hole defined therein perpendicular to the axis; the hole passing through the inner part, the part of the cover layer surrounding the inner part and the plastic cover; the reinforcement insert and the inner part comprising electrically conductive material; the support pin further comprising an electrical contact in the hole and contacting the inner part for making contact with a mating contact in the outer support; the sun visor further comprising a light source contact for supporting an electrical light source on the sun visor body, the light source contact being connected to the reinforcement insert.

15. The sun visor of claim 14 in which the support pin has a second hole spaced apart from the first-mentioned hole defined therein; the support pin further comprising a second electrical contact in the second hole and contacting the inner part for making contact with a second mating contact in the outer support and spaced from the first-mentioned mating contact; the inner part of the support pin comprising first and second electrically conductive end regions for contacting the first and second electrical contacts, respectively; the first and second end regions being axially separated from each other; the reinforcement insert comprising first and second electrically conductive parts connected respectively to the first and second end regions; the first-mentioned light source contact being connected to the first electrically conductive part; the sun visor further comrpsing a second light source contact for supporting the electrical light source and connected to the second electrically conductive part.

16. The sun visor of claim 10 in which the sun visor body has a wall for defining the recess, the sun visor further comprising a plastic frame injection molded directly onto the cover layer surrounding the wall, the support pin forming a part of the plastic frame.

17. The method of manufacturing a sun visor for a vehicle, comprising:
covering a sun visor body with a cover layer; providing a recess in a longitudinal edge of the body;
injection molding a plastic body directly onto the cover layer, the plastic body covering at least part of the perimeter of the recess and defining a support pin extending across the recess.

18. The method of claim 17 in which the injection molding step comprises;
   positioning the halves of an injection mold abutting the cover layer around an inner part of the support pin at each end of the support pin; and
   injecting plastic into the injection mold and forming a tubular plastic body on the cover layer around the inner part.

19. The method of claim 17 in which the injection molding step comprises:
   closing the halves of an injection mold on the cover layer around an abutment piece in the sun visor body; and
   injecting plastic into the injection mold and forming a plastic frame on the cover layer around the abutment piece, the forming of the plastic frame including forming a support pin extending across the recess.

20. The method of claim 17 in which the covering step comprises welding two plastic foil blanks together at their edges around the sun visor body.

* * * * *